United States Patent
Oh et al.

(10) Patent No.: US 7,772,946 B2
(45) Date of Patent: Aug. 10, 2010

(54) ELECTRIC POWER CONNECTION PART OF ELECTROMAGNETIC CLUTCH FIELD COIL ASSEMBLY

(75) Inventors: Sung Taeg Oh, Daejeon (KR); Sung Won Cho, Suwon (KR); Dae Yong Park, Yongin (KR); Hwa Youp Shin, Suwon (KR); Jun-Ho Song, Suwon (KR); Uk Gyu Lim, Suwon (KR)

(73) Assignee: Halla Climate Control Corp., Daejeon (KR)

( * ) Notice: Subject to any disclaimer, the term of this patent is extended or adjusted under 35 U.S.C. 154(b) by 118 days.

(21) Appl. No.: 11/485,821

(22) Filed: Jul. 13, 2006

(65) Prior Publication Data

US 2007/0017770 A1    Jan. 25, 2007

(30) Foreign Application Priority Data

Jul. 20, 2005    (KR) ................ 10-2005-0066049

(51) Int. Cl.
*H01F 7/00* (2006.01)
*H01F 1/00* (2006.01)

(52) U.S. Cl. .................. 335/219; 335/296; 335/299

(58) Field of Classification Search ............ 335/219, 335/220, 225, 226, 229, 234, 249, 250, 256, 335/266, 282, 284, 285, 290, 295, 296, 302
See application file for complete search history.

(56) References Cited

U.S. PATENT DOCUMENTS

| | | | | |
|---|---|---|---|---|
| 4,432,446 A | * | 2/1984 | Okano et al. | 192/84.961 |
| 4,935,713 A | * | 6/1990 | Bekheet | 335/296 |
| 5,121,093 A | * | 6/1992 | Matsushita | 335/296 |
| 5,138,293 A | * | 8/1992 | Ishimaru | 335/289 |
| 5,250,921 A | * | 10/1993 | Van Laningham et al. | 335/296 |
| 5,307,038 A | * | 4/1994 | Ishimaru | 335/296 |
| 5,320,206 A | * | 6/1994 | Maejima | 192/84.961 |
| 5,508,671 A | * | 4/1996 | Takashi | 335/296 |
| 5,687,823 A | * | 11/1997 | Nakagawa et al. | 192/84.961 |
| 5,812,044 A | * | 9/1998 | Sakamoto | 335/299 |
| 5,911,291 A | | 6/1999 | Suetake et al. | |
| 5,924,537 A | * | 7/1999 | Tobayama et al. | 192/84.961 |

(Continued)

FOREIGN PATENT DOCUMENTS

JP    115934    5/1989

(Continued)

*Primary Examiner*—Elvin G Enad
*Assistant Examiner*—Mohamad A Musleh
(74) *Attorney, Agent, or Firm*—The Webb Law Firm

(57) ABSTRACT

An electric power connection part of an electromagnetic clutch field coil assembly connected with an electric power connector at a side of a vehicle engine, includes a housing assembly connected to the field coil assembly with electric wires, which is extracted therefrom, interposed therebetween; a discharge device for absorbing a surge voltage; and a magnetic field elimination device for eliminating a residual magnetic field are injection molded and combonined within the housing assembly. Accordingly, the electric power connection part has an advantage in that it is not directly influenced by heat radiated from a field coil assembly so that electric/electronic devices can be prevented from being damaged; since an epoxy applying process for attaching electric/electronic devices such as a discharge device and a magnetic field elimination device is omitted, a manufacturing process is greatly simplified; and the number of components are reduced so that manufacturing process thereby decreasing costs.

5 Claims, 8 Drawing Sheets

U.S. PATENT DOCUMENTS

| | | | | |
|---|---|---|---|---|
| 5,967,282 | A * | 10/1999 | Takahashi | 192/84.961 |
| 6,707,365 | B2 * | 3/2004 | Fuju | 336/185 |
| 6,838,969 | B2 * | 1/2005 | Suda | 336/90 |
| 6,914,507 | B2 * | 7/2005 | Fujiu | 336/192 |
| 7,138,895 | B2 * | 11/2006 | Chung | 335/299 |
| 7,224,253 | B2 * | 5/2007 | Chung | 335/299 |

FOREIGN PATENT DOCUMENTS

| | | | |
|---|---|---|---|
| JP | 4147592 | A | 5/1992 |
| JP | 7127662 | A | 5/1995 |
| JP | 07-127662 | | 5/1996 |
| JP | 2612500 | B2 | 2/1997 |
| JP | 2557099 | B2 | 8/1997 |
| JP | 9512107 | T | 12/1997 |
| JP | 11247899 | A | 9/1999 |
| KR | 1020040071518 | A | 8/2004 |
| WO | 9529405 | A1 | 11/1995 |
| WO | WO 2004/067982 | | 8/2004 |
| WO | 2004085866 | A1 | 10/2004 |

* cited by examiner

PRIOR ART

PRIOR ART

PRIOR ART

PRIOR ART

ELECTRIC POWER CONNECTION PART OF ELECTROMAGNETIC CLUTCH FIELD COIL ASSEMBLY

TECHNICAL FIELD

The present invention relates to an electric power connection part of an electromagnetic clutch field coil assembly coupled with a vehicle compressor, and more particularly, to a structure of an electric power connection part of an electromagnetic clutch field coil assembly, which can reduce operation processes and costs, and normally maintain performance of a component for a long period of time.

BACKGROUND ART

In general, a vehicle compressor for an air conditioner is operated by means of a driving force of an engine, and an electromagnetic clutch is mounted together to intermittently operate only in a case where air conditioning is required.

FIG. 1 illustrates a general coupling structure of a vehicle compressor and an electromagnetic clutch. An operation principle of the compressor (2) will be briefly described below with reference to FIG. 1.

First, in a case where an engine is operating, a pulley (6) connected from a driving shaft of the engine (not shown) through a belt (not shown) rotates. Further, the pulley (6) is connected to a rotating shaft of the compressor via the electromagnetic clutch. In general, a rotor (8) is coupled with the pulley (6), and an electromagnetic clutch field coil assembly (1) having a coil (1-1) and a coil housing (1-2) is disposed with the rotor (8) at a minute interval. Furthermore, the rotor (8) is connected to the rotating shaft of the compressor (2) with a bearing (7) interposed therebetween.

If a driver turns on a switch for an air conditioner in this state, a disk (2-1) fixedly coupled with the rotating shaft of the compressor (2) and a disk (6-1) fixedly coupled with the pulley (6) are contacted with each other to rotate together by means of a frictional force while electric power is being applied to the electromagnetic clutch field coil assembly (1), so that the compressor (2) is operated.

On the contrary, unless electric power is applied to the electromagnetic clutch field coil assembly (1) through electric power connection lines (3, 4), since the disk (6-1) of the pulley (6) and the disk (2-1) of the compressor (2) are separated from each other, a dynamic force is cut off and the compressor (2) does not operate.

Electric power may be applied to the electromagnetic clutch field coil assembly (1) by manually controlling the switch of the air conditioner, and the application of the electric power to the electromagnetic clutch field coil assembly (1) may be automatically controlled depending on a room temperature of a vehicle by connecting it to an engine control system (ECU) that is not shown.

As a conventional prior art, in Japanese Patent Laid-open Publication No. Hei 07-127662 (published on May 16, 1996) is disclosed a surge absorption device for absorbing a surge voltage generated when an application of an electric current to a magnetic coil is temporally suspended by positioning a diode connected to an internal terminal of a connector. Further, PCT WO 2004/067982 (published on Aug. 12, 2004) is a prior art applied by the present applicant and discloses a configuration in which a diode and a resistor are employed to absorb a surge, and a sleeve structure for connecting a space between a field coil assembly and an additional external electric power is additionally provided so that it is manually fastened directly to a connector formed in the field coil assembly.

That is, as shown in FIGS. 2 and 3, a connection part (10) of the conventional electromagnetic clutch field coil assembly (1) comprises a sleeve assembly (11) formed in the field coil assembly (1) and a housing assembly (12) connected to the sleeve assembly (11) through electric wires (3).

Further, as shown in FIGS. 3, 4a and 4b, the conventional sleeve assembly (11) is manufactured by injection molding in a state where terminal (13) and the electric wires (3) are put in a mold. Accordingly, a diode (14) and a resistor (15) that are essential components are installed by finishing with epoxy (19) in a state where after the foregoing injection molding has been completed.

Thus, a manufacturing process may be added due to the addition of the expoxy treatment process, and a rise in costs and a lowering of productivity are caused due to labor cost.

Further, since the sleeve assembly (11) is injection molded together with the terminal (13), the sleeve assembly (11) is positioned to be very close to the electromagnetic clutch field coil assembly (1) and the compressor (2). Accordingly, heat generated from the field coil assembly (1) and the compressor (2) is transmitted directly to the sleeve assembly (11) so that it has a bad influence that performance of the diode (14) and the resistor (15) attached to the sleeve assembly (11) is deteriorated, and the like.

Meanwhile, the housing assembly (12) is a component connected to the sleeve assembly (11) through the electric wires (3) and functions as a connector of an electric power. Further, the housing assembly (12) generally has a configuration in which an additional housing (12-1), a clip (12-2) and a bracket (12-3) are assembled together. The bracket (12-3) is a component for preventing sway and deviation of the housing (12-1), and generally mounted on a surface of a case of the compressor (2) by means of a bolt (16) or the like.

However, since, the housing assembly (12) generally has a configuration in which an additional housing (12-1), a clip (12-2) and a bracket (12-3) are assembled together, a manufacturing process is complicated, they may be deviated from one another in use, and it causes a failure that a wire or the like is adhered to the compressor (2) with a high temperature in deviation.

DISCLOSURE OF THE INVENTION

It is an object of the present invention to provide an electric power connection part of an electromagnetic clutch field coil assembly, which can reduce manufacturing costs and enhance productivity.

It is another object of the present invention to provide an electric power connection part of an electromagnetic clutch field coil assembly, wherein heat radiated from a field coil assembly and a compressor is not directly transmitted so that damage of an electronic/electric component can be prevented.

It is a further object of the present invention to provide an electric power connection part of an electromagnetic clutch field coil assembly, wherein a connecting position of a discharge device is controlled so that the discharge can be prevented form being damaged by means of a vibration generated from a vehicle and a compressor.

To achieve these objects of the present invention, there is provided an electric power connection part of an electromagnetic clutch field coil assembly according to the present invention, wherein a discharge device for absorbing a surge voltage and a magnetic field elimination device for eliminating a residual magnetic field are injection molded and combonined within a housing assembly.

Preferably, the discharge device and the magnetic field elimination device are a diode and a resistor, respectively, and the discharge device and the magnetic field elimination device are injection molded and combined in a state where they are fixed with holders, respectively.

In this case, the housing assembly may comprise a housing that is an injection molding product coupled with electric wires and a bracket for mounting the housing on a compressor, and the housing and the bracket may be injection molded in a single body or separated to fix the bracket to the housing.

Meanwhile, the present invention provides a method of manufacturing an electric power connection part of an electromagnetic clutch field coil assembly, comprising the following steps: inserting a discharge device, a magnetic field elimination device and electric wires; connecting the discharge device, the magnetic field elimination device and the electric wires to terminal to fabricate a mid-assembly; and molding the mid-assembly to form a housing.

BEST MODE FOR CARRYING OUT THE INVENTION

Hereinafter, preferred embodiments of the present invention will be described in detail with reference to the accompanying drawings.

Figure 1:
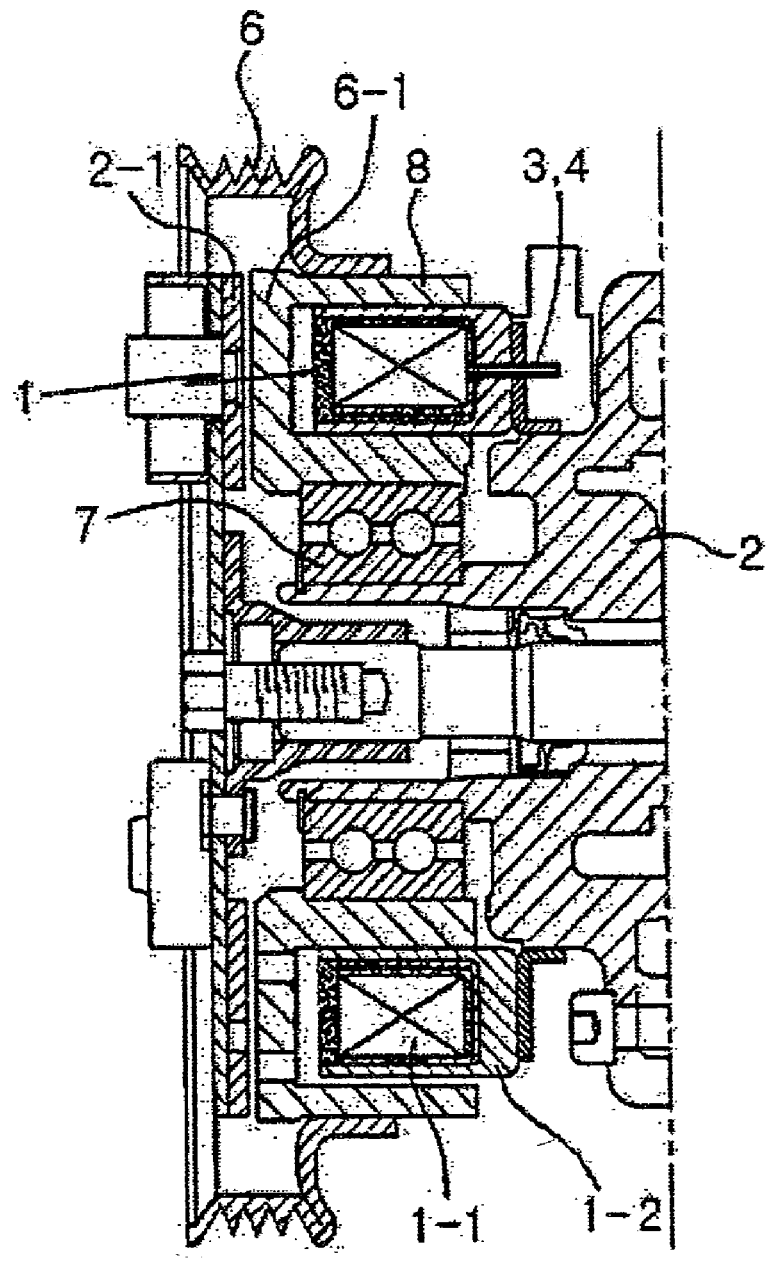
FIG. 1 is a sectional view showing a general coupling structure of a vehicle compressor and an electromagnetic clutch.
Figure 2:
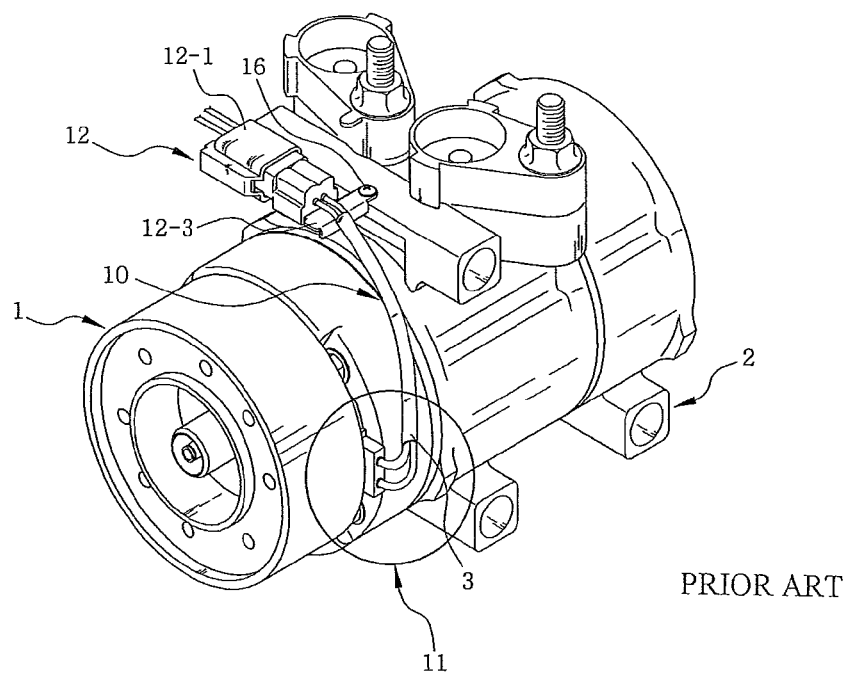
FIG. 2 is a perspective view showing a general coupling structure of a vehicle compressor and an electromagnetic clutch field coil assembly.
Figure 3:
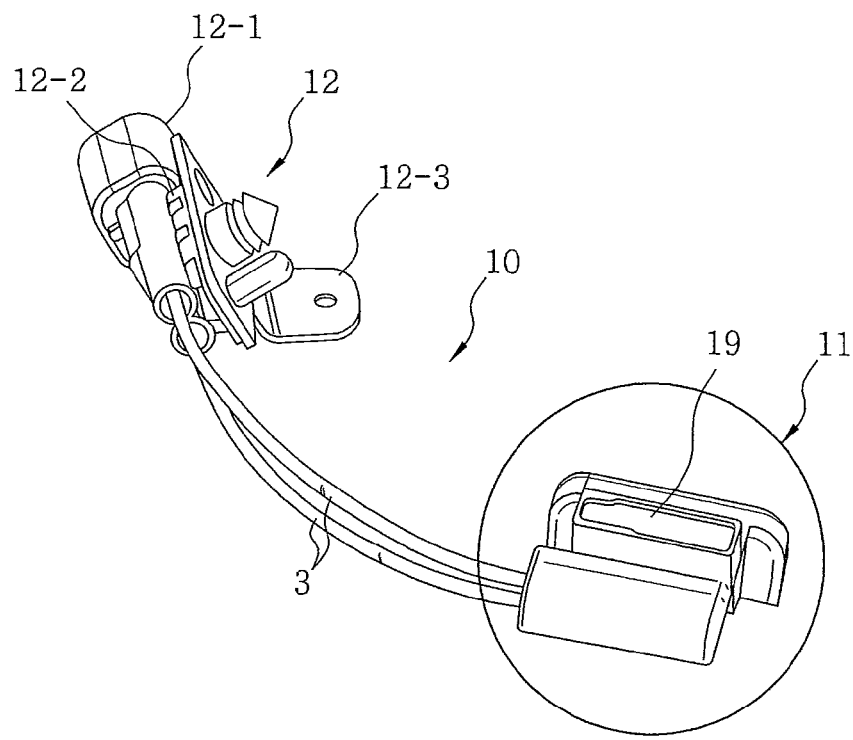
FIG. 3 is a perspective view showing a structure of an electric power connection part of a general electromagnetic clutch field coil assembly.
Figure 4A:
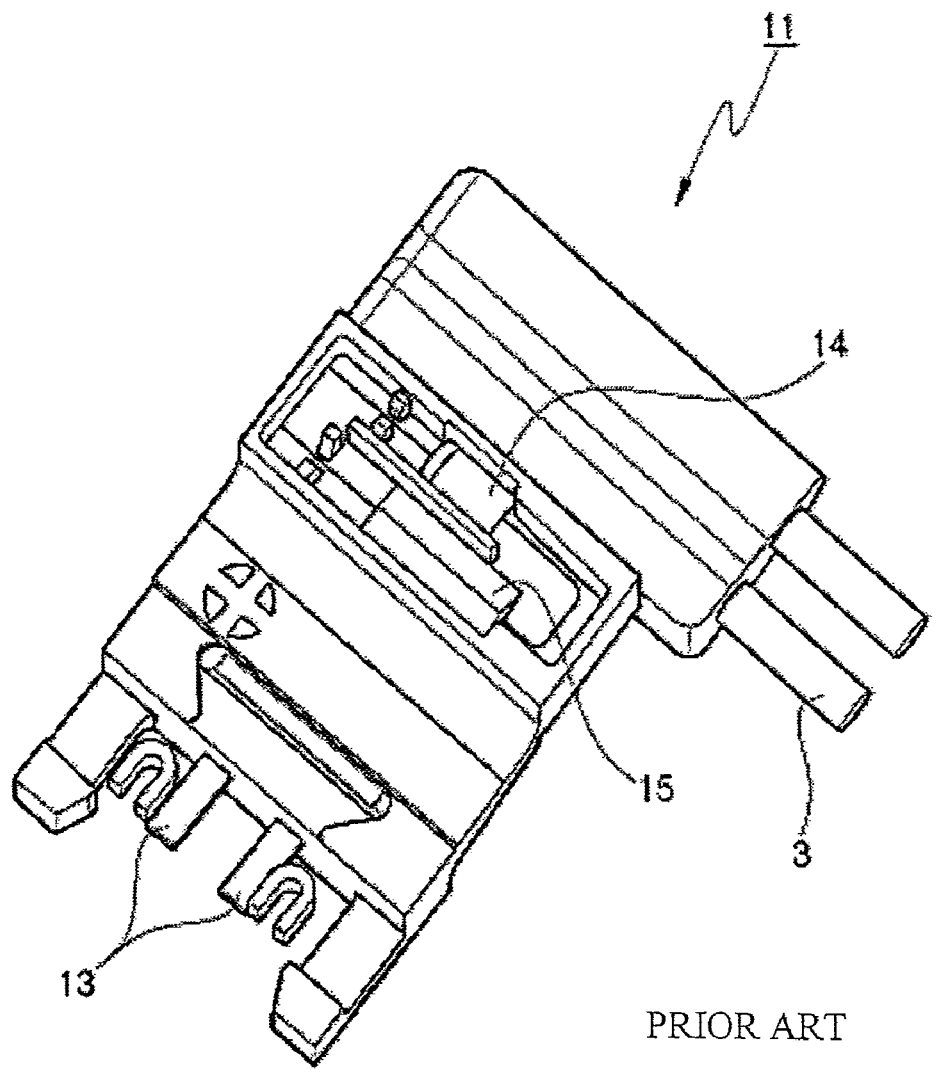
FIGS. 4a and 4b are magnified views respectively showing a sleeve assembly and a housing assembly in FIG. 3.
Figure 4B:
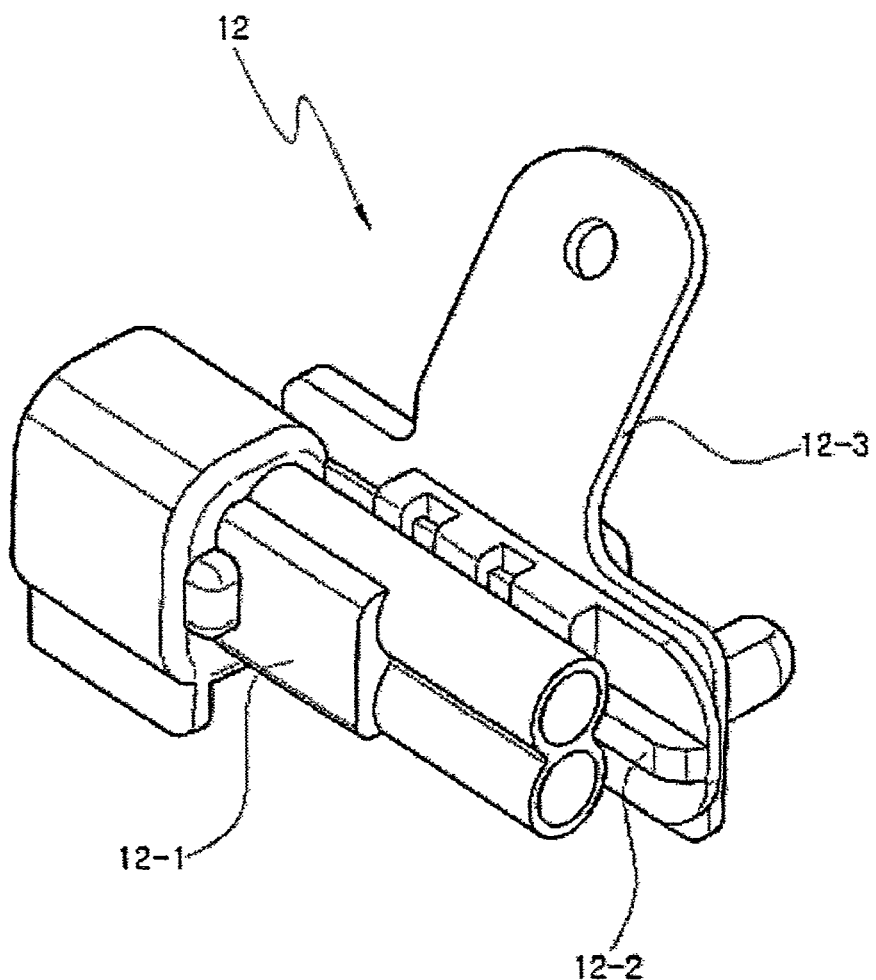
Figure 5:
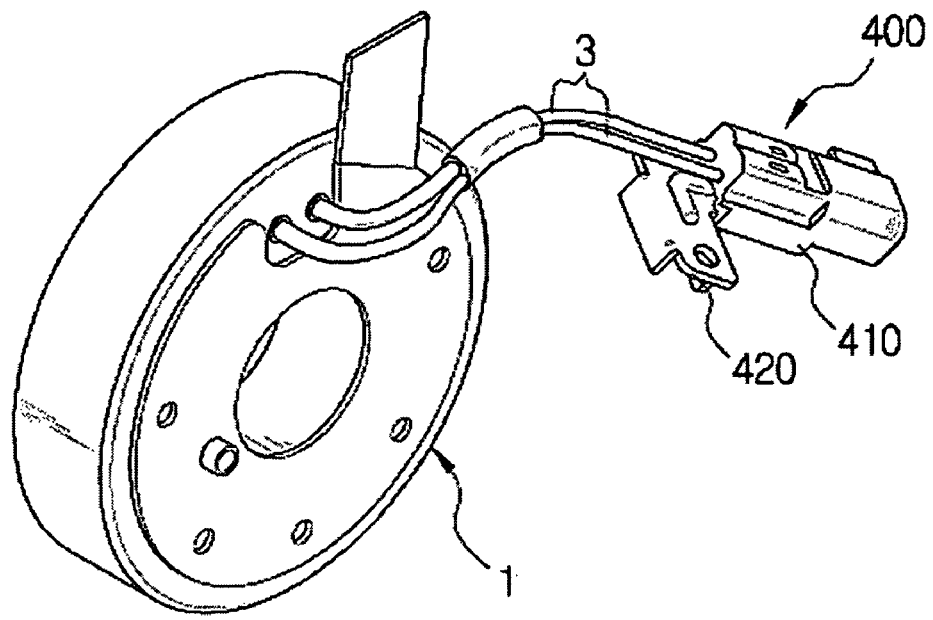
FIG. 5 is a perspective view showing a structure of an electric power connection part of an electromagnetic clutch field coil assembly according to the present invention.
Figure 6A:
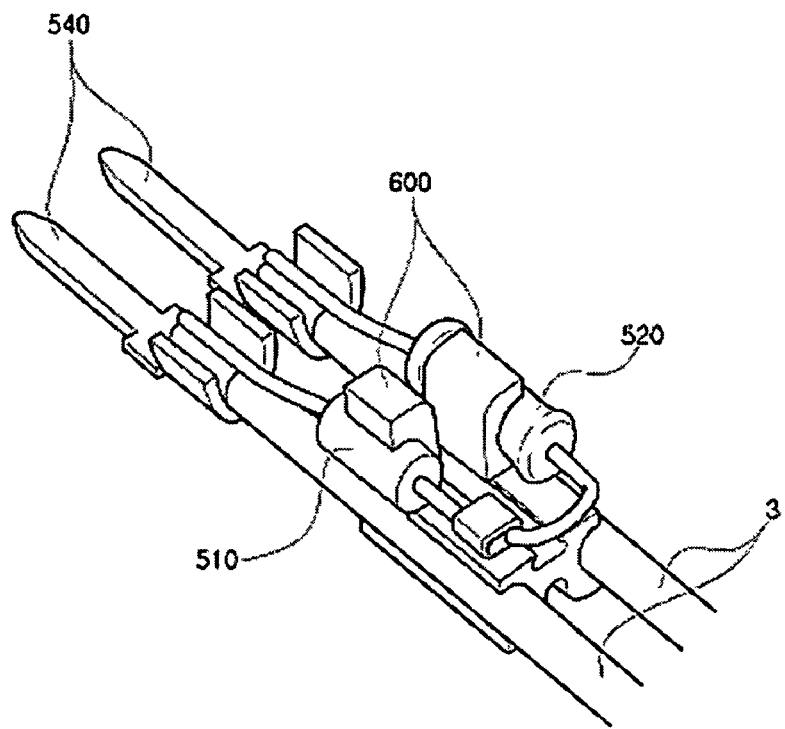
FIG. 6a is a perspective view showing an internal mounting structure before being injection molded as a housing assembly.
Figure 6B:
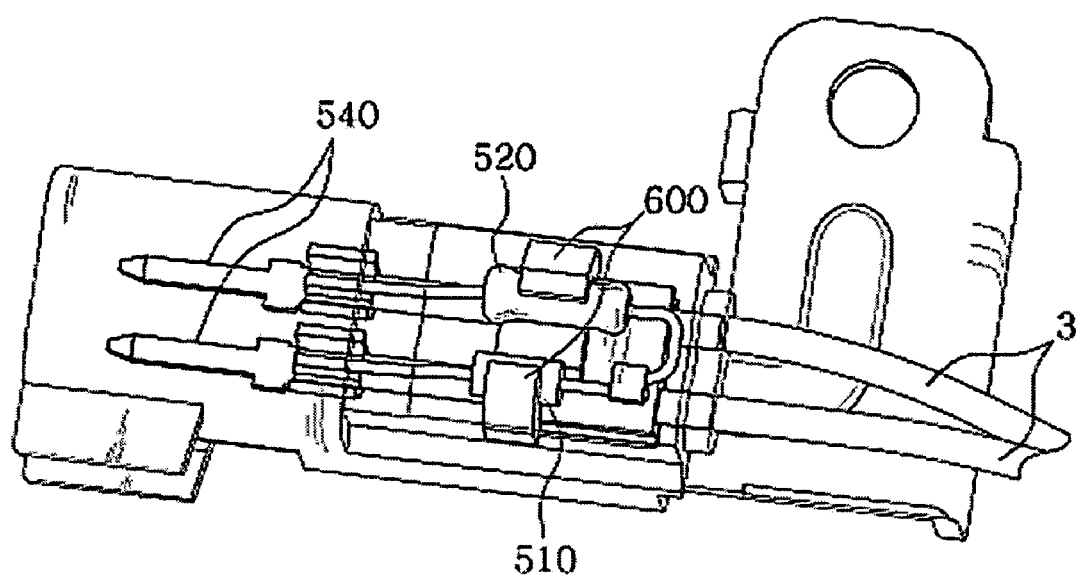
FIG. 6b is a perspective view showing a mounting position of an internal mounting structure in a housing assembly.

FIGS. 5, 6a and 6b illustrate structures showing a connection part of an electromagnetic clutch field coil assembly for a vehicle compressor according to this embodiment. In these figures, an electromagnetic clutch field coil assembly(1), a compressor (2) and electric wires (3) refer to a general structure shown in FIG. 2, and the field coil assembly (1) has a configuration in which an electromagnetic coil body (not shown) formed such that an electromagnetic coil is wound in a ring shape inside the field coil assembly (1) is inserted into a coil housing (not shown) while being housed in a bobbin (not shown), and a pair of the electric wires (3) is extracted to the outside.

As shown in these figures, the electric power connection part of an electromagnetic clutch field coil assembly coupled with a vehicle compressor according to this embodiment comprises a housing assembly (400) connected to the field coil assembly (1) with the electric wires (3) extracted from the field coil assembly (1) interposed therebetween. Further, an additional contacting means for electric power connection may be further provided between the field coil assembly (1) and the housing assembly (400).

The housing assembly (400) may be mounted at an appropriate position on a surface of a body of the compressor (2). In FIG. 5, the housing assembly (400) is mounted at a position extending outward from a side of a case in the vicinity of a central position of a lateral direction of the compressor (2). Accordingly, since the housing assembly (400) can be mounted at a relative distance from the field coil assembly (1), heat generated from the field coil assembly (1) is not transmitted directly to the housing assembly (400).

In this embodiment, a diode (510) and a resistor (520) that are essential components of the electric power connection part are housed within the housing assembly (400).

Specifically, the diode (510) and the resistor (520) are injection molded and combined within the housing assembly (400). At this time, if the diode (510) and the resistor (520) are injection molded in a state where they are respectively fixed with additional holders (600) as shown in FIG. 6a, modification and preponderance due to an injection molding pressure can be prevented. Moreover, if the holder (600) fixes even the electric wires (3), respectively, advance mounting is firmly established. Reference numeral 540 denotes a terminal The holder (600) may fix the electric wires (3) at an inner side thereof as shown in FIG. 6a and fix the electric wires (3) at an outer side thereof as shown in FIG. 6b. Further, the holder (600) is not limited to a component with a certain fixed shape but may have elasticity in view of a characteristic of a material. Further, the holder (600) may include a simple adhesive means such as a cotton tape or an electric tape.

FIG. 6b shows what position the holders (600) fixing the diode (510) and the resistor (520), the terminal (540) and the electric wires (3) are mounted within the housing assembly (400) such that they are injection molded in a single body. An end of the terminal (540) is formed to protrude within a space for connecting with a connector (not shown).

Further, the housing assembly (400) comprises a housing (410) that is an injection molding product with which the electric wires (3) are coupled and a bracket (420) for mounting the housing (410) on the compressor (2). Although the housing (410) and the bracket (420) may be formed such that they are respectively separated as additional configurations and attached/detached free by means of insertion, they are preferably formed in a single body by means of injection molding.

Meanwhile, as shown in FIG. 6b, a method of manufacturing an electric power connection part of a field coil assembly according to the present invention, comprising the following steps: respectively fixing a discharge device (510) and a magnetic field elimination device (520) with holders (600); aligning and inserting the fixed discharge device (510) and magnetic field elimination device, and electric wires (3) to fit in the respective mounting positions of a body with a housing assembly shape; connecting the discharge device (510), the magnetic field elimination device (520) and the electric wires (3) to terminal (540) by means of crimping or welding to fabricate a mid-assembly; respectively fixing ends of the terminals (540) and the electric wires (3) to circumferential surfaces of the holders (600) and then molding them; and completing a final electric power connection part.

Figure 7A:
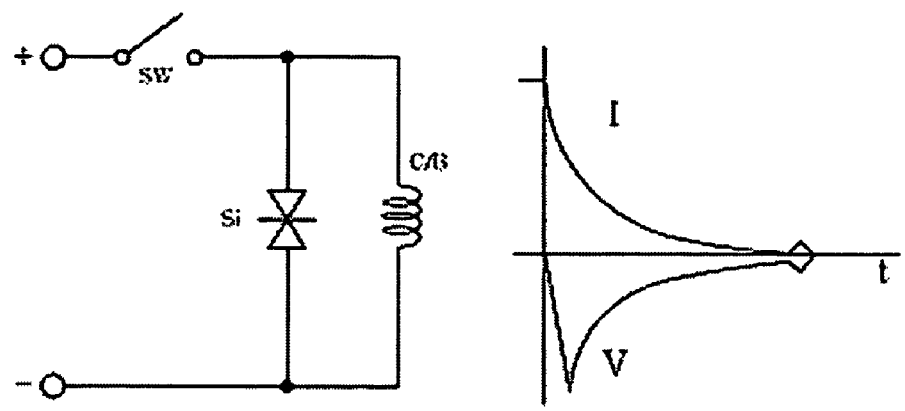
FIGS. 7a to 7e are views illustrating various kinds of discharge circuits applied to a discharging device according to the present invention.
Figure 7B:
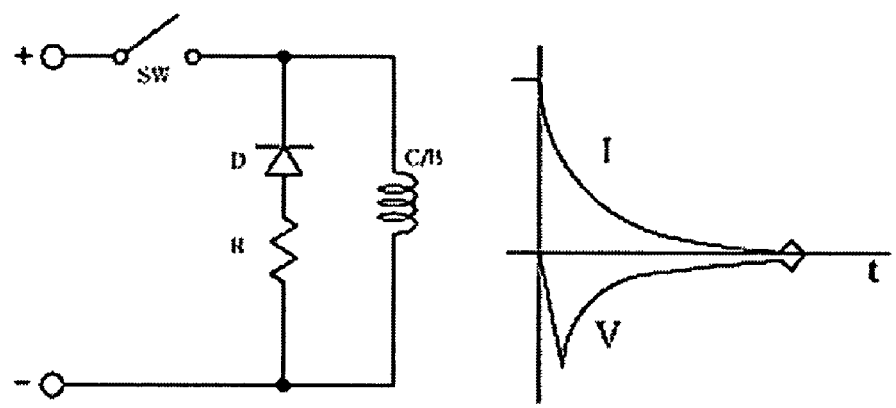
Figure 7C:
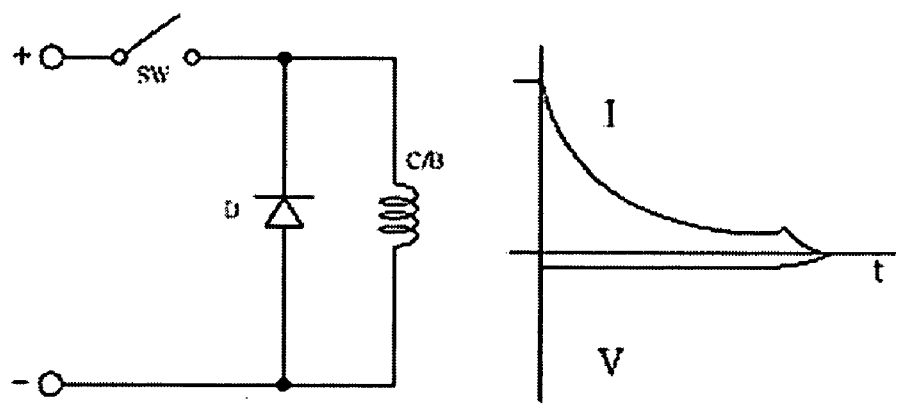
Figure 7D:
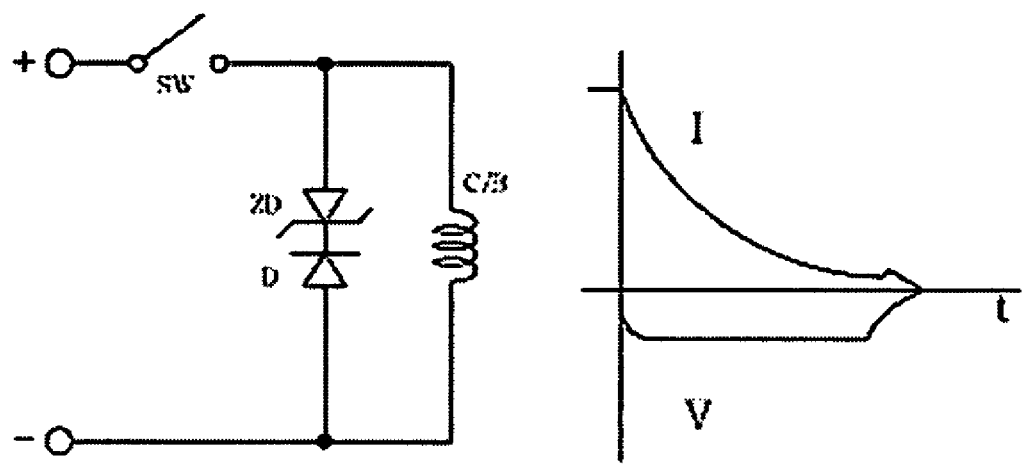
Figure 7E:
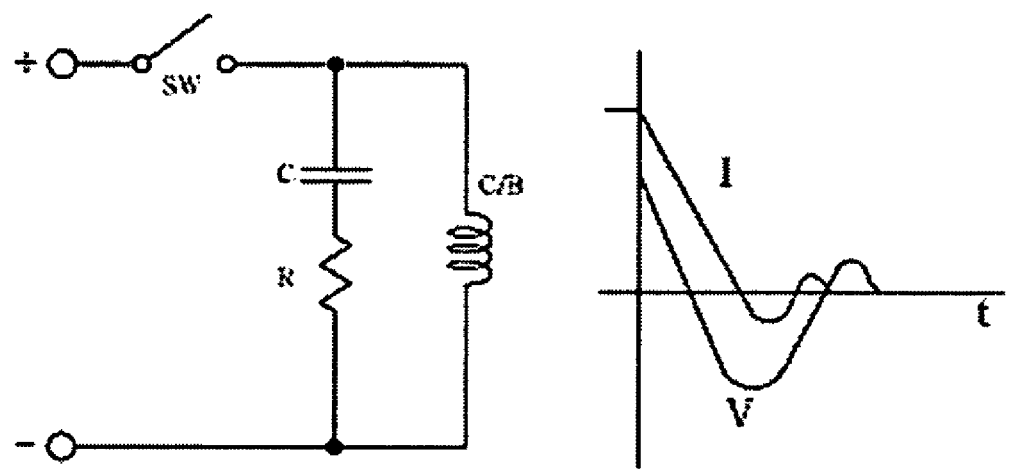

FIGS. 7a to 7e illustrate various kinds of discharge circuits applied to the discharge device (510) according to the present invention. A varistor type of FIG. 7a is the most general discharge circuit and a type in which the capacitance of a capacitor varies to change an electrostatic capacity value. Since an absorption efficiency is relatively desirable as a counter-electromotive voltage of 100V or so, the varistor type has a characteristic of a fast OFF time. A resistor type of FIG. 7b uses a characteristic in that a counter-electromotive voltage is small and an OFF time is increased if a resistance value is small, and the resistance is preferably larger about 10 times than the internal resistance of a coil. A diode type of FIG. 7c can completely absorb a counter-electromotive voltage and has an OFF time longer maximum 3 to 4 times comprared with the varistor type. However, it is required to note torque interference when using a clutch. A zenor diode type of FIG. 7d has an OFF time faster in comparison with the diode type depending on whether or not a zenor diode is inserted. A counter-electromotive voltage is determined depending on a voltage of the zenor diode, and the zenor diode type is mainly used in a small capacity clutch. Finally, a CR (Capacitor-Resistor) type of FIG. 7e enable an OFF time to be fast by appropriately selecting a capacitor and a resistance value, and is mainly used in a small capacity clutch.

INDUSTRIAL APPLICABILITY

According to the present invention of a configuration described above, since a diode and a resistor are housed within a housing assembly, the present invention is not directly influenced by heat radiated from a field coil assembly and can prevent a discharge device from being damaged due to vibration and carelessness in handling.

Further, since an epoxy applying process for attaching electric/electronic devices such as a diode and a resistor is omitted, a manufacturing process is greatly simplified.

Furthermore, if the electric/electronic devices are injection molded while being previously fixed with a holer, a case where the devices deviate or preponderate can be prevented.

In addition, there is an advantage in that if a housing assembly is formed in a single body or composed of only a housing and a bracket, manufacturing process and costs can be greatly decreased.

Moreover, there is an operation effect in that a connecting position of a discharge device is controlled so that the discharge device can be prevented from being damaged due to vibration generated from a vehicle and a compressor.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An electric power connection part connected to an electromagnetic clutch field coil assembly, the electric power connection part comprising:
    a terminal for electrically connecting with an electric power connector at a side of a vehicle engine;
    a couple of electric wires extending from the field coil assembly to be directly connected to the terminal;
    a discharge device having a lead wire connected with one of the electrical wires for absorbing a surge voltage;
    a magnetic field elimination device having another lead wire connected with another electric wire for eliminating a residual magnetic field, wherein the ends of the discharge device and the magnetic field elimination device opposite the connections thereof to the lead wires are connected together;
    holders fixing the discharge device and the magnetic field elimination device and comprising a unitary or single piece; and
    a housing assembly injection molded as a whole in the state with the terminal electrically connected to (a) the discharge device and (b) the magnetic field elimination device which are fixed by the holders, and (c) the couple of wires.

2. The electric power connection part of claim 1, wherein the discharge device is a diode.

3. The electric power connection part of claim 1, wherein the magnetic field elimination device is a resistor.

4. The electric power connection part of claim 1, wherein the housing assembly includes a bracket for mounting the housing assembly on a compressor.

5. The electric power connection part of claim 4, wherein the housing assembly and the bracket are formed in a single body by means of injection molding.

* * * * *

UNITED STATES PATENT AND TRADEMARK OFFICE
CERTIFICATE OF CORRECTION

| | | |
|---|---|---|
| PATENT NO. | : 7,772,946 B2 | Page 1 of 1 |
| APPLICATION NO. | : 11/485821 | |
| DATED | : August 10, 2010 | |
| INVENTOR(S) | : Oh et al. | |

It is certified that error appears in the above-identified patent and that said Letters Patent is hereby corrected as shown below:

On the title page

Item (57) ABSTRACT, line 8, "and combonined" should read -- and combined --

Item (57) ABSTRACT, lines 17 and 18,
"so that manufacturing process thereby decreasing costs." should read
-- so that manufacturing process costs are thereby decreased. --

Signed and Sealed this
Eighteenth Day of December, 2012

David J. Kappos
*Director of the United States Patent and Trademark Office*